March 18, 1958 R. VINSONHALER ET AL 2,826,897
FISH DIVERSION LOUVER SYSTEM
Filed Dec. 1, 1954
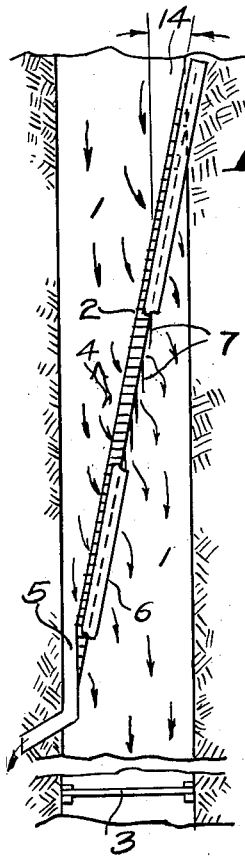
Fig.1.
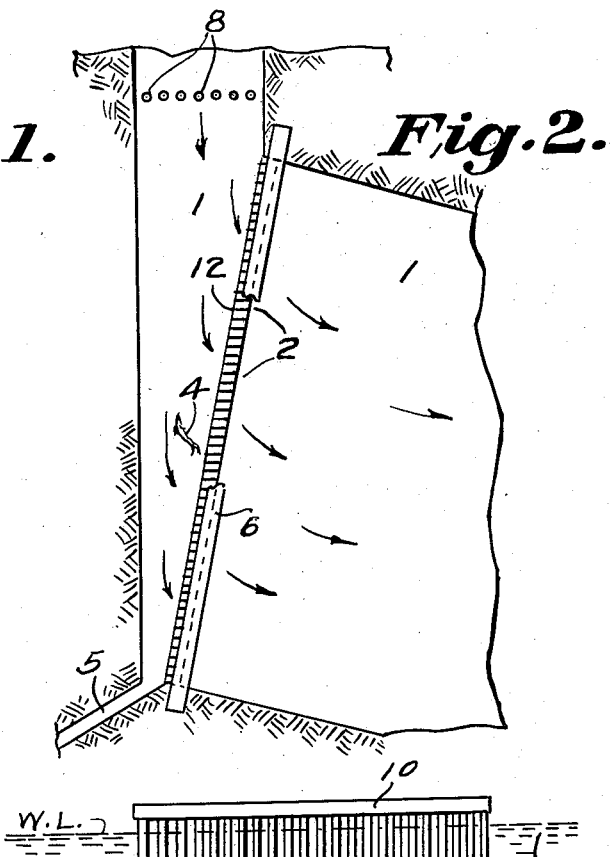
Fig.2.
Fig.3.
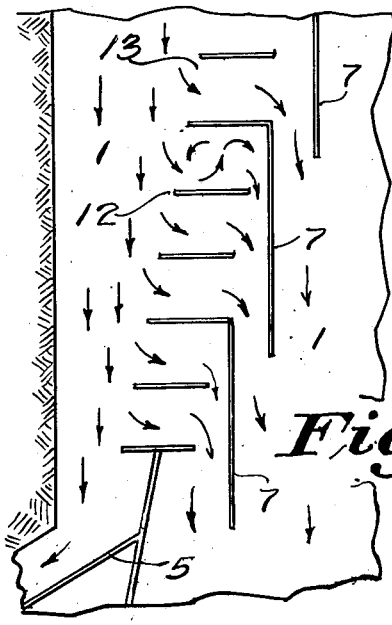
Fig.4.
INVENTORS
RUSSELL VINSONHALER,
DANIEL W. BATES and
GEORGE O. BLACK
BY
ATTORNEY 2,826,897

FISH DIVERSION LOUVER SYSTEM

Russell Vinsonhaler, Tracy, and Daniel W. Bates and George O. Black, Stockton, Calif., assignors to the United States of America as represented by the Secretary of the Interior Application December 1, 1954, Serial No. 472,538

7 Claims. (Cl. 61—21)

(Granted under Title 35, U. S. Code (1952), sec. 266)

The invention described herein may be manufactured and used by or for the Government of the United States for governmental purposes without the payment to us of any royalty thereon in accordance with the provisions of Title 35 U. S. C. 266.

The present invention relates to an apparatus for directing the movement of fish in a flowing stream of water.

It is an object of the invention to provide an effective and economical apparatus for use in diverting fish away from water intakes.

It is a further object of this invention to reduce the number of fish killed below the number killed in present screening systems.

It is a still further object of this invention to decrease the head loss and the operating costs of present screening systems.

Other objects of the invention will appear more fully from the following description taken in connection with the accompanying drawings wherein:

Fig. 1 is a plan view of the louver deflector system in position in a stream.

Fig. 2 is a plan view of the louver deflector system showing an optional arrangement where there is a curve in the stream.

Fig. 3 is a front elevational view of a portion of the louver deflector system.

Fig. 4 is a detailed plan view of the louvers and redirectional vanes.

The apparatus embodying the present invention is particularly adapted to directing fish in a stream of flowing water into a fish by-pass without the necessity of using large amounts of water to make the by-pass effective. The louvers act as a barrier which the fish are unwilling to approach. Instead, the fish swims in the direction involving the least effort necessary to keep away from the louver system. Because of the angling of the louver system to the flow of the water, this direction is roughly perpendicular to and away from the system. This results in the fish being carried downstream parallel to the system.

However, silt, leaves, et cetera, which foul up ordinary fish screens are free to flow through the louvers; hence, the louver system requires less maintenance. Further, because of the large area between the louvers and the reduction of turbulence by the redirection vanes, head loss is kept to a minimum.

Referring to the drawings, shown in Fig. 1 is a stream 1 flowing through a louver system 2 towards a dam 3 or other type of water intake. A fish 4 migrating down the stream 1 with the current senses the presence of the louver system 2. The fish 4 swims away from the louver system 2 in the direction of least resistance. Because of the velocity of the flowing water and the positioning of the louver system 2 in relation to this directional flow, the direction of least resistance to keep away from the louver screen 2 is roughly perpendicular thereto.

While the fish 4 is swimming away from the louver system 2, he is being carried towards the downstream end of the system by the downstream velocity of the water. Thus the motion of the fish 4 is downstream and substantially parallel to the louver system 2. The fish 4 continues to move in this direction until entering a by-pass canal 5.

The by-pass canal 5 may re-enter the stream 1 below the area of water intake or may flow into a recovery pond from which the fish 4 are removed and transported to a more favorable water area. It is important that there be no sudden changes in velocity. Thus, the velocity of water in the by-pass 5 should be about the velocity of the flow of the stream 1 or at a faster but uniformly accelerated velocity than the velocity of the stream 1.

An operating deck 6 may be constructed over the top of the louver system 2 so that damaged portions of the system 2 may be removed or obstacles that have become entangled with the system 2 may be disengaged. This deck 6 can be attached to poles, not shown, driven into the bed of the stream 1. It can then serve as the top support of the louver system 2.

Redirection vanes 7 serve to redirect the flow of the water from the louver system 2 in the direction of the water intake 3. This reduces the turbulence that results from the water flowing through the louver system 2 and the greater turbulence that would result if the water did not emerge from the louver system 2 in the direction of the water intake 3. It is found that these redirection vanes 7 serve to decrease the head loss caused by the louver system 2.

In Fig. 2 are shown two optional arrangements meeting special conditions in certain areas where this invention may be employed. The trash racks 8 may be used in areas where timber or other heavy debris is customarily present in the stream 1. The trash racks 8 are used to prevent this heavy debris from obstructing and damaging the louver system 2. It will be noted that, because the angle of the stream 1 is abruptly shifted so that the water emerging from the louver system 2 is flowing in the desired direction, there is no need for the redirection vanes 7. This arrangement can be conveniently used when there is a curve in the stream 1 where the louver system 2 is to be used.

In Fig. 3 a sill 9 rests on the bottom of the stream 1 or on supports, not shown, at a predetermined depth and position in the stream 1; and a header 10 is above the ordinary maximum water level 11. The louver forming slats 12 may be constructed of any convenient material. Wood and metal have given satisfactory results. The sill 9 and the header 10 comprise the frame and are the bottom and top supports respectively to which the louver forming slats 12 are secured.

A flow pattern 13 represented by arrows in Fig. 4 indicates how a smooth even velocity is maintained throughout the length of the louver system 2 and into the by-pass canal 5.

The louver forming slats 12 repel the fish 4 most effectively when positioned normal to the current flow, but where reduction of head loss is crucial, they may be sloped slightly. The louver forming slats 12 may be of any convenient breadth, say two inches. The spacing between the louver forming slats 12 may vary from one installation to the next; however, a spacing of less than one inch results in increased head loss and increased fouling of the louver system 2. A spacing of more than three inches results in a slight increase in the number of fish 4 passing through the system 2. Therefore, a spacing of one to three inches is recommended for most installations. Spacing in individual installations is dependent upon quantity and size of the debris in the water, the size and specie of the fish 4 to be saved, the velocity of the water and the allowable head loss.

The louver system 2 is effective to save fish 4 approximately one inch or more in length. Most fingerlings less than one inch long lack the ability to swim effectively in any moving current of water. Therefore, their salvage is not considered economically feasible.

Still referring to Fig. 4, the bottom of the redirection vanes 7 should extend below the top of the next succeeding redirection vane 7. This reduces the turbulence on the down stream side of the louver system 2 and thereby decreases the head loss caused by the louver system 2. A satisfactory overlap has been found to be two inches.

In Fig. 1, an angle 14 between the direction of flow of the stream 1 and the longitudinal axis of louver screen 2 is dependent on the allowable head loss and the velocity of the stream 1. The smaller the angle 14, the smaller the fish 4 that can be saved. The recommended angle 14 for average flow velocities to save fingerlings of one inch in length and longer is from ten degrees to sixteen degrees. Good results have been obtained with a twelve degree angle 14.

The by-pass canal 5 need be only slightly larger than the expected maximum width of the fish 4 found in the stream 1. For most installations a size of six inches will be sufficient with a larger size only resulting in increased water diversion.

The fish 4 slowly swimming down the stream 1 senses the presence of the louver system 2. The fish 4 swims away from this obstacle 2; and, because of the resultant velocity obtained by the combination of the downstream velocity and the fish's velocity, the fish 4 is carried roughly parallel to the louver system 2. The fish 4 continues this direction of travel until he enters the by-pass canal 5 down which he swims until he reaches the area of safety. The water coming through the louver system 2 goes to the intake 3 with only a minimum amount of water having been lost for the purpose of fish salvage through the by-pass channel 5.

While the invention has been described in its preferred form, it may be further modified and embodied within the scope of the subjoined claims.

We claim:

1. A fish diversion system comprising a watercourse, a louver screen inserted on edge into said watercourse, and a by-pass canal, said louver screen comprising a frame, louver-forming slats carried by the frame extending in spaced relation to each other across the space between the entrance to said by-pass canal on the one side of the watercourse and the opposite side of the watercourse and forming a louver assembly, said assembly being positioned on edge diagonally across the watercourse adjacent and at a level with or below to the inlet to the by-pass canal, the broad faces of the louver slats positioned substantially at right angles to the flow of the stream, whereby the main body of water flows between the slats but the fish are repelled from the assembly and a portion of the main stream is diverted with the fish into the by-pass canal.

2. A fish diversion system comprising a watercourse, a louver screen inserted on edge into said watercourse, and a by-pass canal, said louver screen comprising a frame, louver-forming slats with the longitudinal axes of the slats extended vertically, said slats carried by said frame extending in spaced relation to each other across the space between the entrance to the by-pass canal on one side of the watercourse at the downstream end of said screen and the opposite side of the watercourse and forming a louver assembly, said assembly being positioned on edge diagonally across the watercourse adjacent and on a level with or below the inlet to the by-pass canal with the broad faces of the slats positioned substantially at right angles to the flow of the stream, whereby the main body of water flows between the slats but the fish are repelled from the assembly and a portion of the main stream is diverted with the fish into the by-pass canal.

3. A fish diversion system comprising a watercourse, a louver screen inserted on edge into said watercourse, and a by-pass canal, said louver screen comprising a frame, louver-forming slats carried by the frame in which the longitudinal axes of the slats extend vertically, said slats extending in spaced relation to each other across the space between the entrance to the by-pass canal on one side of the watercourse and the opposite side of the watercourse and forming a louver assembly, said assembly, being positioned on edge diagonally across the watercourse with the downstream end of said assembly adjacent and at a level with or below the inlet to the by-pass canal with the broad faces of the slats positioned substantially at right angles to the flow of the stream, whereby the main body of water flows between the slats but the fish are repelled from the assembly and a portion of the main stream is diverted with the fish into the by-pass canal, and vanes extending downstream from the frame assembly on its outlet side in spaced relation to each other to redirect the direction of flow of water emerging from the louvers into the normal flow pattern.

4. A fish diversion system comprising a watercourse, a louver screen positioned diagonally across the watercourse with the broad faces of the louver-forming slats being positioned normal to the flow of the watercourse and from substantially 1 to 3 inches apart, a fish by-pass canal with the entrance to said canal positioned between one side of the watercourse and the downstream termination of said louver screen, whereby fish avoiding this screen on a downstream migration will be swept into the by-pass canal.

5. A fish diversion system, comprising a watercourse adapted to contain downstream travelling fish in the water between its banks, an upright water-pervious screen extending transversely on edge across substantially an entire cross section of the water in the watercourse from one of its banks diagonally downstream to its opposite bank forming a barrier at an angle to the flow to repel the fish, and a by-pass canal leading from the watercourse in the last-mentioned bank adjacent the upstream side of the screen, whereby fish in the approach flow to the screen, repelled from the screen, are guided in their travel into the water flowing into the by-pass.

6. A fish diversion system, comprising a watercourse adapted to contain downstream travelling fish in the water between its banks, an upright water-pervious screen extending tranversely on edge across substantially an entire cross section of the water in the watercourse from one of its banks diagonally downstream to its opposite bank forming a barrier at an angle to the flow to repel the fish, the screen being formed of a frame and louver-forming slats extending across the frame in vertical position and in spaced relation to each other to form a louver assembly with the sidewalls of each slat at about right angles to the approach flow, and a by-pass canal leading from the watercourse in the last mentioned bank adjacent the upstream side of the screen, whereby fish in the approach flow to the screen, repelled from the screen, are guided in their travel into the water flowing into the by-pass.

7. A fish diversion system, comprising a watercourse adapted to contain downstream travelling fish in the water between its banks, an upright water-pervious screen extending tranversely on edge across substantially an entire cross section of the water in the watercourse from one of its banks diagonally downstream to its opposite bank forming a barrier at an angle to the flow to repel the fish, the screen being formed of a frame, louver-forming slats carried by the frame in vertical position in spaced relation to each other across the frame to form a louver assembly with the sidewalls of each slat at about right angles to the approach flow to permit flow of water through the screen while repelling the fish, vertically disposed vanes extending downstream from the louver assembly in spaced relation to each other with their adjoining sidewalls substantially parallel with the direction of the watercourse to re-direct the flow of water emerging downstream from between the louvers, and a by-pass canal leading from the watercourse in the last mentioned bank adjacent the upstream side of the screen, whereby fish in the approach flow to the screen are repelled from the screen and are guided in their travel into the water flowing into the by-pass, the line of said flow disturbances to be positioned at an angle of substantially 10 to 16 degrees from the direction of the downstream flow.

References Cited in the file of this patent

FOREIGN PATENTS 355,845  France _____ 1905